(12) United States Patent
Shonk

(10) Patent No.: US 11,369,062 B2
(45) Date of Patent: Jun. 28, 2022

(54) AGRICULTURAL BALER WITH INTERMESHING FEED ROTORS

(71) Applicant: CNH Industrial America LLC, New Holland, PA (US)

(72) Inventor: Jason L. Shonk, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 301 days.

(21) Appl. No.: 16/412,835

(22) Filed: May 15, 2019

(65) Prior Publication Data

US 2020/0359567 A1    Nov. 19, 2020

(51) Int. Cl.
*A01F 15/10*    (2006.01)

(52) U.S. Cl.
CPC ........ *A01F 15/10* (2013.01); *A01F 2015/108* (2013.01)

(58) Field of Classification Search
CPC ................ A01F 15/10; A01F 2015/102; A01F 2015/108
USPC ...................................... 100/179, 188 R, 191
See application file for complete search history.

(56) References Cited

U.S. PATENT DOCUMENTS

| | | | |
|---|---|---|---|
| 4,926,749 A | 5/1990 | Neale et al. | |
| 5,269,126 A * | 12/1993 | Kalverkamp | A01D 45/025 56/60 |
| 5,848,523 A * | 12/1998 | Engel | A01F 15/106 56/341 |
| 6,055,799 A * | 5/2000 | Savoie | A01D 43/10 56/16.4 A |
| 6,354,938 B1 * | 3/2002 | Schrattenecker | A01F 12/40 241/47 |
| 6,679,042 B1 * | 1/2004 | Schrag | A01F 15/10 56/341 |
| 6,874,311 B2 | 4/2005 | Lucand et al. | |
| 7,510,472 B1 | 3/2009 | Farley et al. | |
| 7,677,965 B2 | 3/2010 | Farley et al. | |
| 7,694,504 B1 | 4/2010 | Viaud et al. | |
| 8,381,503 B2 | 2/2013 | Roberge | |
| 2011/0024538 A1 * | 2/2011 | Matousek | A01D 43/06 241/191 |
| 2017/0105355 A1 * | 4/2017 | Rosseel | A01D 90/14 |
| 2018/0249641 A1 * | 9/2018 | Lewis | A01F 29/025 |

* cited by examiner

*Primary Examiner* — Jimmy T Nguyen
(74) *Attorney, Agent, or Firm* — Patrick Sheldrake; Peter Zacharias

(57) ABSTRACT

A feeder unit for an agricultural baler includes: a first rotor including a plurality of first extensions extending therefrom, the first rotor being configured to rotate about a first axis of rotation at a first rotation speed; and a second rotor arranged in parallel with the first rotor relative to the axis of rotation and including a plurality of second extensions extending therefrom that intermesh with the plurality of first extensions, the second rotor being configured to rotate about a second axis of rotation at a second rotation speed that is different from the first rotation speed.

20 Claims, 5 Drawing Sheets

AGRICULTURAL BALER WITH INTERMESHING FEED ROTORS

FIELD OF THE INVENTION

The present invention pertains to agricultural vehicles and, more specifically, to agricultural balers.

BACKGROUND OF THE INVENTION

Known agricultural balers are provided with a rotor feeder unit that feeds crop material, e.g. supplied by a pick-up device, into a bale forming cavity in case of a so called round baler or into a feeder duct, also known as pre-compression chamber, in case of a so called rectangular baler. Another agricultural machine that includes such a rotor feeder unit is a loading wagon. The rotor feeder unit of a loading wagon feeds the crop material, e.g. supplied by a pick-up device, into a storage hopper of the loading wagon.

Known rotor feeder units for agricultural machines in general comprise a rotor feeder carrying a set of extensions, such as tines, the rotor feeder being rotatable about a first axis of rotation; a rotor feeder unit bottom wall distant from the rotor feeder forming a lower boundary of a conveying channel through the rotor feeder unit; and scrapers placed in feeding direction behind the rotor feeder, the scrapers extending in between the tines and having a leading face cooperating with the tines. Some known rotor feeder units are further provided with a rotor feeder drive for causing the rotor feeder to rotate about its axis of rotation, the rotor feeder drive coupling to a power source.

In operation, the rotor feeder is rotated about its axis of rotation by the rotor feeder drive, such that the tines carried by the rotor feeder pass through the conveying channel in a conveying direction. The tines carried by the rotor feeder take supplied crop material and force the crop material through the conveying channel in the conveying direction. The scrapers remove the cut crop material from the tines and guide it further in the conveying direction through the conveying channel. This is sufficient to feed the crop material toward a bale chamber where baling of the crop material takes place, but does not control the length of the fed crop material.

What is needed in the art is a baler that can feed different lengths of crop material to the bale chamber.

SUMMARY OF THE INVENTION

Exemplary embodiments disclosed herein provide a feeder unit for an agricultural baler with rotors that have intermeshing extensions and can rotate at different speeds relative to one another.

In some exemplary embodiments provided according to the present disclosure, a feeder unit for an agricultural baler includes: a first rotor including a plurality of first extensions extending therefrom, the first rotor being configured to rotate about a first axis of rotation at a first rotation speed; and a second rotor arranged in parallel with the first rotor relative to the axis of rotation and comprising a plurality of second extensions extending therefrom that intermesh with the plurality of first extensions, the second rotor being configured to rotate about a second axis of rotation at a second rotation speed that is different from the first rotation speed.

In some exemplary embodiments provided according to the present disclosure, an agricultural baler includes: a chassis; a power take-off carried by the chassis; a bale chamber carried by the chassis and comprising a baling mechanism coupled to the power take-off and configured to form a bale from fed crop material; and a feeder unit carried by the chassis and configured to feed crop material toward the bale chamber. The feeder unit includes: a first rotor including a plurality of first extensions extending therefrom, the first rotor being configured to rotate about a first axis of rotation at a first rotation speed; and a second rotor arranged in parallel with the first rotor relative to the axis of rotation and comprising a plurality of second extensions extending therefrom that intermesh with the plurality of first extensions, the second rotor being configured to rotate about a second axis of rotation at a second rotation speed that is different from the first rotation speed.

In some exemplary embodiments disclosed herein, a method of controlling chop quality of crop material fed to a bale chamber of an agricultural baler is provided. The method includes: rotating a first rotor comprising a plurality of first extensions about a first axis of rotation at a first rotation speed; and rotating a second rotor at a second rotation speed that is different from the first rotation speed, the second rotor being arranged in parallel with the first rotor relative to the axis of rotation and comprising a plurality of second extensions extending therefrom that intermesh with the plurality of first extensions.

One possible advantage that may be realized by exemplary embodiments disclosed herein is the second extensions can have a sharpened trailing edge, relative to a feeding direction, so the difference in the first rotation speed and the second rotation speed can control a chop quality of crop material that is fed to the bale chamber.

Another possible advantage that may be realized by exemplary embodiments disclosed herein is the first rotor and the second rotor can have the same rotation speed when it is desired to feed crop material to the bale chamber without chopping the crop material.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
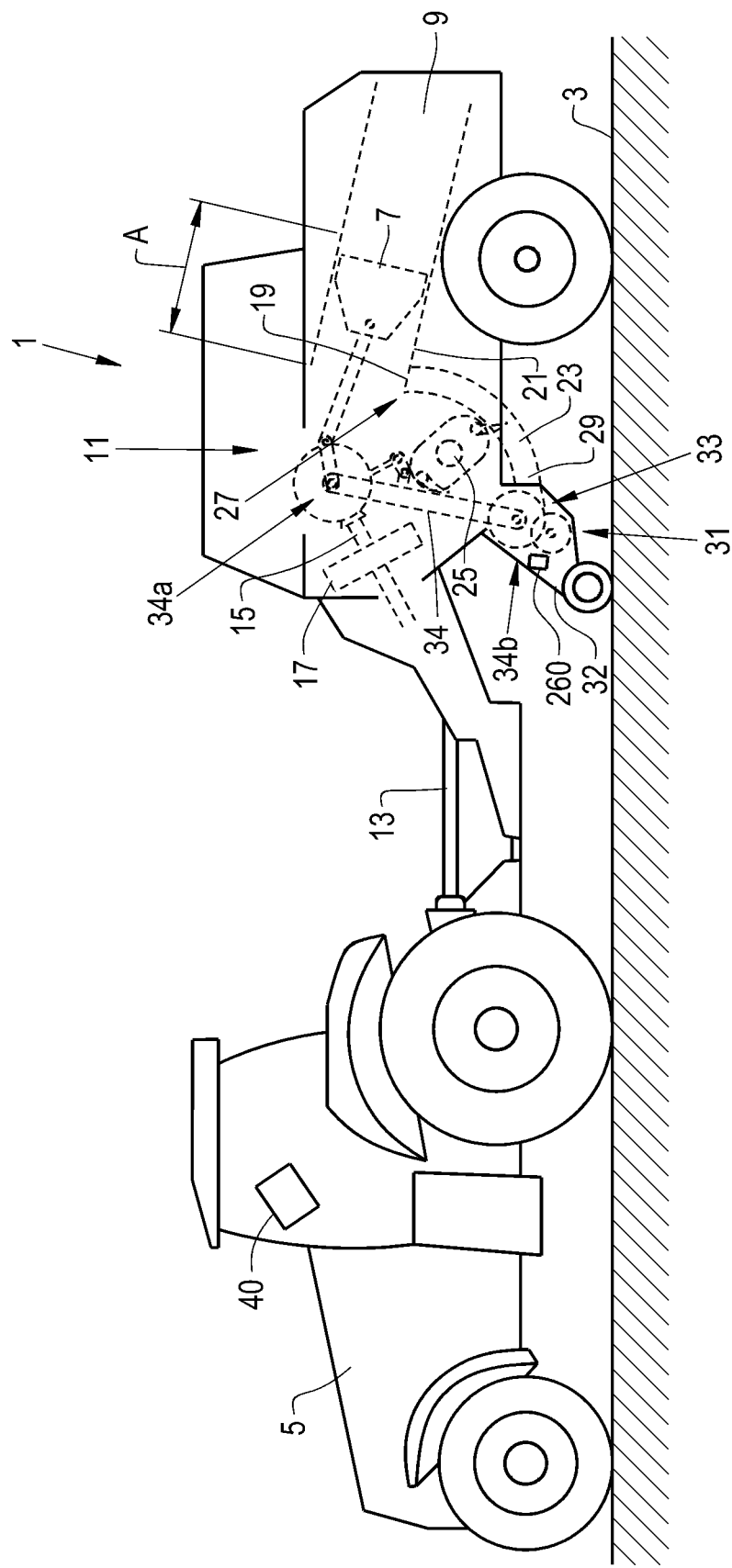
FIG. 1 illustrates a side view of an exemplary embodiment of an agricultural baler including a feeder unit, provided in accordance with the present disclosure.

Referring now to the drawings, and more particularly to FIG. 1, an exemplary embodiment of a baler 1 provided according to the present disclosure is illustrated. The baler 1 is illustrated and described as being in the form of a rectangular baler, which may also be referred to as a "large square" baler, but it should be appreciated that the present disclosure is similarly applicable to other types of balers, such as round balers. The baler 1 can be moved forward over ground surface 3 by a tractor 5. The baler 1 is provided with a plunger 7 that, during operation, is moved reciprocally along a linear path A in bale chamber 9 by a crank mechanism 11 connected to the plunger 7. The crank mechanism 11 is connected for driving via a drive shaft 13 to the motor of the tractor 5. The tractor 5 is provided for this purpose with a power take-off, also referred to as a PTO. The drive shaft 13 connects an output shaft of the PTO of the tractor 5 to an input shaft 15 of the crank mechanism 11. A flywheel 17 is arranged on the input shaft of the crank mechanism. Collectively, the crank mechanism 11 and the plunger 7 may be referred to as a "baling mechanism" that is coupled to the power take-off.

The bale chamber 9 has an inlet opening 19 formed in a bottom wall 21 thereof. A feeder duct 23 communicates with the bale chamber 9 through the inlet opening 19 for charges of crop material to be transferred from the feeder duct 23 into the bale chamber 9. A chamber feeder 25 is operable within the feeder duct 23 to accumulate a charge of crop material therein and then stuff that accumulated charge into the bale chamber 9. The feeder duct 23 has an upper end 27 facing generally upwardly and communicating with the inlet opening 19 in the bale chamber 9 and a lower end 29 facing generally in a forward direction and communicating with a feeder unit 31. The feeder unit 31 is arranged for cutting crop material supplied by a pick-up device 32 and to feed the cut crop material into the feeder duct 23 toward the bale chamber 9. The feeder unit 31 is provided with a rotor assembly 33 and a rotor driver 34. The rotor driver 34 has an input 34a drivingly coupled to the drive shaft 13 and has an output 34b drivingly coupled to the rotor assembly 33.

Figure 2:
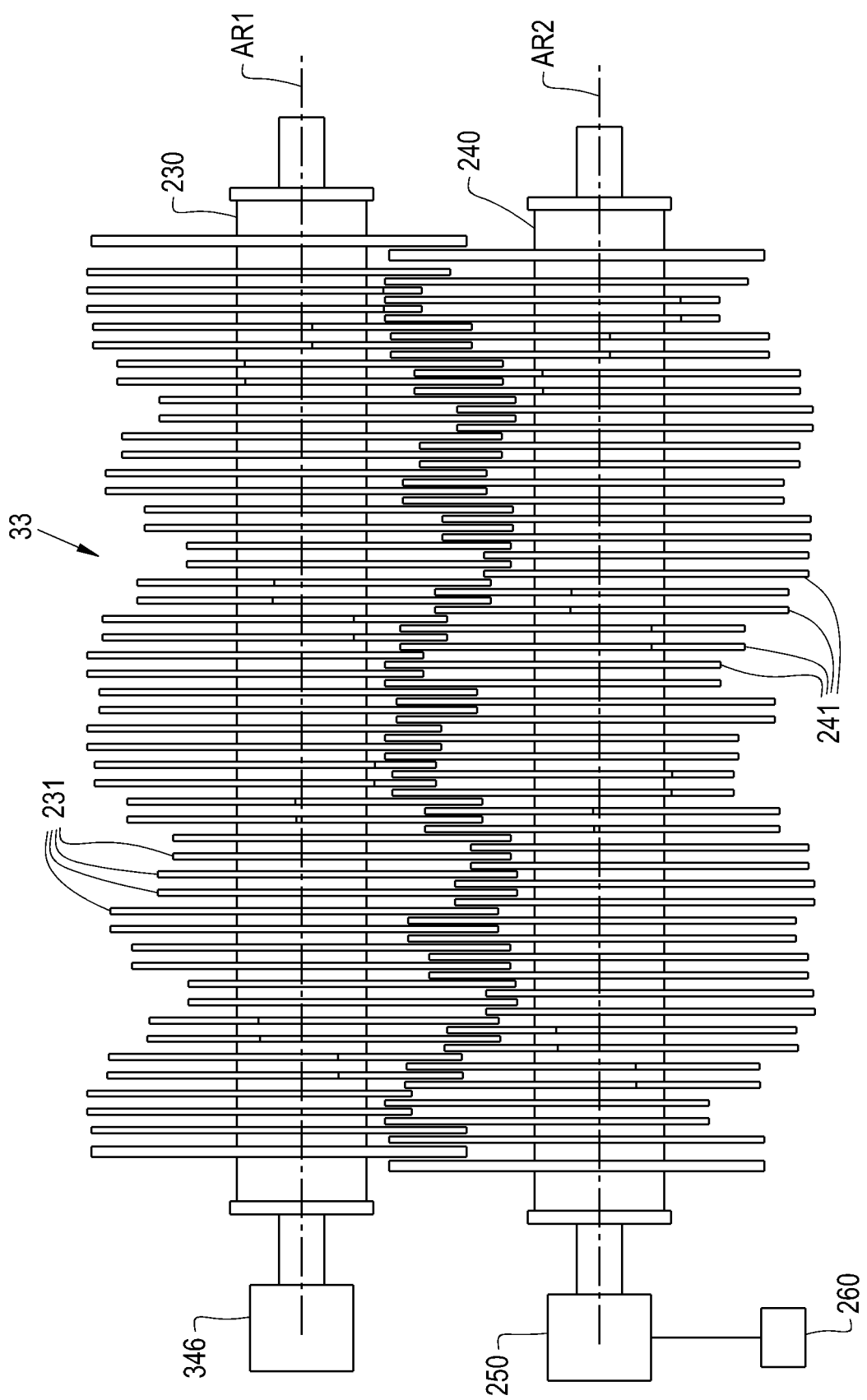
FIG. 2 is a front view of the feeder unit illustrated in FIG. 1.
Figure 3:
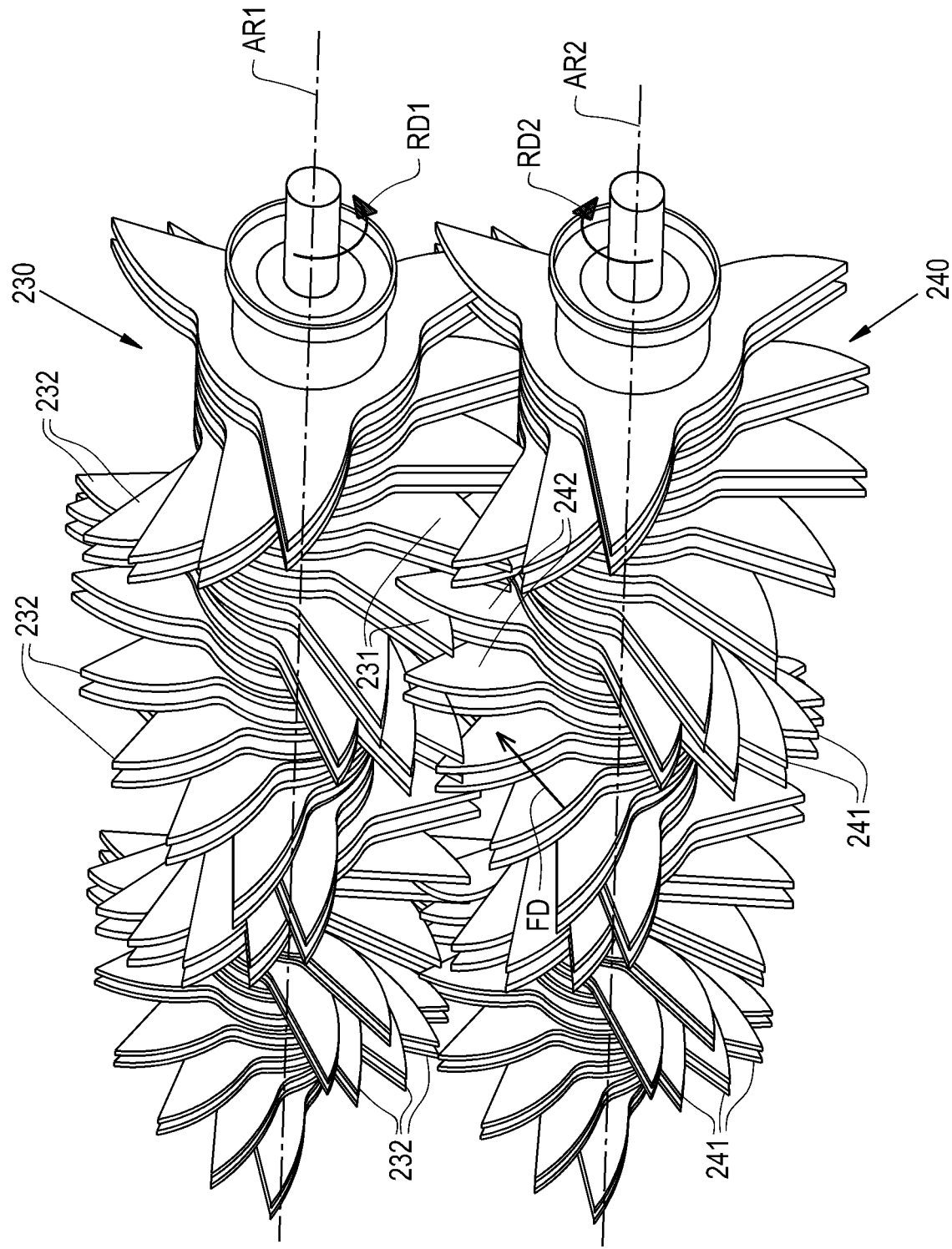
FIG. 3 is a perspective view of the feeder unit illustrated in FIGS. 1-2.

Referring now to FIGS. 2-3, an exemplary embodiment of the rotor assembly 33 is illustrated in further detail. As illustrated, the rotor assembly 33 includes a first rotor 230 with a plurality of first extensions 231 extending therefrom and a second rotor 240 with a plurality of second extensions 241 extending therefrom. The first rotor 230 may be, for example, a top rotor and the second rotor 240 may be, for example, a bottom rotor, as illustrated. The first rotor 230 is configured to rotate about a first axis of rotation AR1 and the second rotor 240 is arranged in parallel with the first rotor 230, relative to the first axis of rotation AR1, and configured to rotate about a second axis of rotation AR2. In this respect, the first axis of rotation AR1 and the second axis of rotation AR2 are generally parallel to one another. The first extensions 231 and the second extensions 241 intermesh together such that, during rotation, some, or all, of the first extensions 231 rotate between two of the second extensions 241, and vice-versa. The significance of this intermeshing will be further explained herein.

The first rotor 230 is configured to rotate about the first axis of rotation AR1 at a first rotational speed and the second rotor 240 is configured to rotate about the second axis of rotation AR2 at a second rotational speed that is different than the first rotational speed. As illustrated in FIG. 3, the first rotor 230 may rotate about the first axis of rotation AR1 in a first rotation direction, illustrated by arrow RD1 as being counter-clockwise, and the second rotor 240 may rotate about the second axis of rotation AR2 in a second rotation direction, illustrated by arrow RD2 as being clockwise, that is opposite the first rotation direction RD1. In this sense, crop material that is fed by each of the rotors 230, 240 travels in a feeding direction, illustrated as arrow FD, toward the bale chamber 9.

During rotation of the rotors 230, 240, the first rotational speed of the first rotor 230 in the first rotation direction RD1 may be greater than the second rotational speed of the second rotor 240 in the second rotation direction RD2. In such a scenario, leading edges 232 of the first extensions 231, relative to the feeding direction FD, travel past trailing edges 242 of the second extensions 241, which are also defined relative to the feeding direction FD. Crop material moved by the leading edges 232 of the first extensions 231 tends to be forced against the trailing edges 242 of the second extensions 241. Due to the intermeshing of the extensions 231, 241, the leading edges 232 forcing the crop material against the trailing edges 242 causes a scissor-like cutting action so the crop material is chopped into smaller pieces before being fed in the feeding direction FD toward the bale chamber 9. The aggressiveness of the chop can be controlled by, for example, altering a ratio between the first rotational speed of the first rotor 230 and the second rotational speed of the second rotor 240. When the first rotational speed of the first rotor 230 is significantly higher than the second rotational speed of the second rotor 240, such as two to three times greater, the chop can be quite aggressive to produce crop material with a smaller average length that is fed toward the bale chamber 9. Aggressive chopping may be desired, for example, when forming a primary section of a bale. When the first rotational speed of the first rotor 230 is close to the second rotational speed of the second rotor 240, such as only 1.1 to 1.3 times greater, the chop can be less aggressive to produce crop material with a larger average length that is fed toward the bale chamber 9. Less aggressive chopping may be desired, for example, when forming a core of the bale or an outer perimeter of the bale to allow relatively easy retention of the bale with net wrap or twine. It should be appreciated that the foregoing is exemplary only, and the ratio of the rotational speeds of the rotors 230, 240 can be adjusted in a variety of ways to adjust the chop aggressiveness.

To promote chopping of the crop material, the trailing edges 242 of the second extensions 232 can be sharp edges comprising a metal, which may or may not be coated with a high-hardness coating such as tungsten carbide. The trailing edges 242 of the second extensions 241 may, for example, have a reduced thickness compared to the rest of each second extension 241 to chop crop material during feeding. In some embodiments, the trailing edges 242 of the second extensions 241 are replaceable knives that can be detached from the second extensions 241 and replaced if, for example, the knives become worn or damaged through use.

The first rotor 230 may be driven by the output 34b of the rotor driver 34. To rotate the second rotor 240, a second rotor driver 250 may be coupled to the second rotor 240 to rotate the second rotor 240 independently of the first rotor 230. In some embodiments, the rotor driver 34 is configured to rotate the first rotor 230 at a relatively constant first rotational speed. In contrast, the second rotor driver 250 may be an adjustable speed driver to rotate the second rotor 240 at variable rotational speeds, which may be lower than the rotational speed of the first rotor 230. The second rotor driver 250 may be, for example, a hydraulic motor or an electric motor that can be controlled to adjust the rotational speed of the second rotor 240. When chopping of crop material is not desired, the second rotor driver 250 can be controlled so the first rotational speed of the first rotor 230 and the second rotational speed of the second rotor 240 are generally the same, i.e., the second rotor 240 also rotates at the first rotational speed. When the first rotor 230 and the second rotor 240 rotate at the same rotational speed, the leading edges 232 of the first extensions 231 do not tend to pass the trailing edges 242 of the second extensions 241 during rotation so cutting action of crop material does not tend to occur. Further, the second rotor driver 250 can also be configured to rotate the second rotor 240 in a direction that is reverse to the normal second rotation direction RD2, i.e., counter-clockwise, to, for example, dislodge crop material that is plugged between the rotors 230, 240.

To control the second rotor driver 250, and thus the second rotational speed of the second rotor 240, a controller 260 can be operatively coupled to the second rotor driver 250 and configured to output a second rotation speed signal to the second rotor driver 250, which signals for the second rotor driver 250 to rotate the second rotor 240 at the second rotational speed. For example, a user in the tractor 5 may select a chop quality icon presented on a display 40 (illustrated in FIG. 1) that is operatively coupled to the controller 260 to select a desired aggressiveness of the chop, which correlates to the difference in rotational speeds between the first rotor 230 and the second rotor 240. If the user wants an aggressive chop, the controller 260 can output a second rotation speed signal to the second rotor driver 250 that causes the second rotor driver 250 to rotate the second rotor 240 at a relatively low second rotational speed compared to the first rotational speed, as previously described. A lower second rotational speed, relative to the first rotational speed, corresponds to a more aggressive chop. In contrast, if the user wants a less aggressive chop, or no chop at all, the controller 260 can output a second rotation speed signal to the second rotor driver 250 that causes the second rotor driver 250 to rotate the second rotor 240 at a relatively high second rotational speed that is similar to, if not the same, as the first rotational speed. It should be appreciated that, in some embodiments, the controller 260 can be configured to output a second rotational speed to the second rotor driver 250 to rotate the second rotor 240 at a second rotational speed that is greater than the first rotational speed.

From the foregoing, it should be appreciated that providing the feeder unit 31 with a rotor assembly 33 having two rotors 230, 240 that can rotate at different rotational speeds allows crop material to be fed toward the bale chamber 9 while also controlling chop quality of the crop material by adjusting the relative rotational speeds of the rotors 230, 240 to one another. Such a configuration addresses some of the problems of known feeder units 31, which generally provide a counter-knife to the extensions of a rotor, such as plugging of the knives by crop material and difficulty in replacing worn knives. The second rotor 240 provided according to the present disclosure can, for example, be provided with replaceable knives at the trailing edges 242 of the second extensions 241 that are easily replaceable due to not being concealed within the machine. Further, the second rotor 240 can rotate either clockwise or counter-clockwise so the second rotor 240 can clear plugged crop material that accumulates between the rotors 230, 240, as opposed to counter-knives which generally plug at knife slots holding the counter-knives. Therefore, exemplary embodiments of the feeder unit 31 provided according to the present disclosure can both adjustably feed and chop crop material headed toward the bale chamber 9 while being less prone to plugging and easier to repair than known feeder units.

Figure 4:
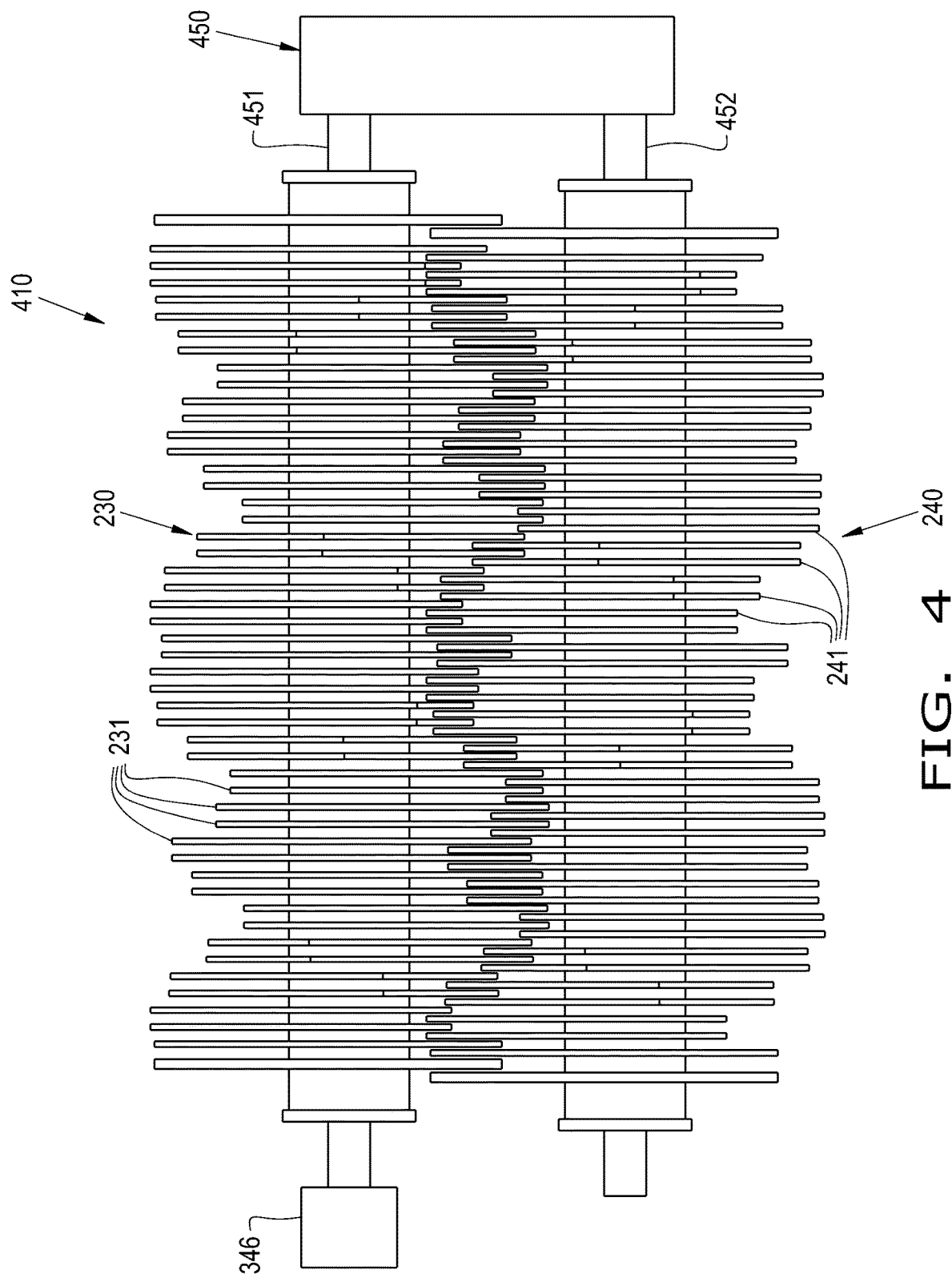
FIG. 4 is a front view of another exemplary embodiment of a feeder unit that includes a gearbox coupled to a first rotor for driving a second rotor, provided in accordance with the present disclosure.

Referring now to FIG. 4, another exemplary embodiment of a feeder unit 410 provided according to the present disclosure is illustrated that utilizes a gearbox 450 to variably drive the second rotor 240, rather than a separate second rotor driver. The gearbox 450 may have a gearbox input 451 that couples to the first rotor 230 and a gearbox output 452 that couples to the second rotor 240. The gearbox 450 may, for example, include a plurality of gears that work in tandem to adjust a gear ratio of the gearbox 450, as is known. Many different variations of gearboxes are known, so further description of the internal workings of the gearbox 450 are omitted for brevity. Due to the gearbox input 451 being coupled to the first rotor 230, rotation of the first rotor 230 by the rotor driver 34 can cause a corresponding rotation of the second rotor 240 via the gearbox 450, with the gear ratio of the gearbox 450 determining the ratio of the first rotational speed of the first rotor 230 to the second rotational speed of the second rotor 240. In some embodiments, the gearbox 450 can be controlled by the controller 260 or a different mechanism to adjust the gear ratio to achieve the desired chop. In other respects, the feeder unit 410 can be similar to the previously described feeder unit 31, so further description is omitted for brevity.

Figure 5:
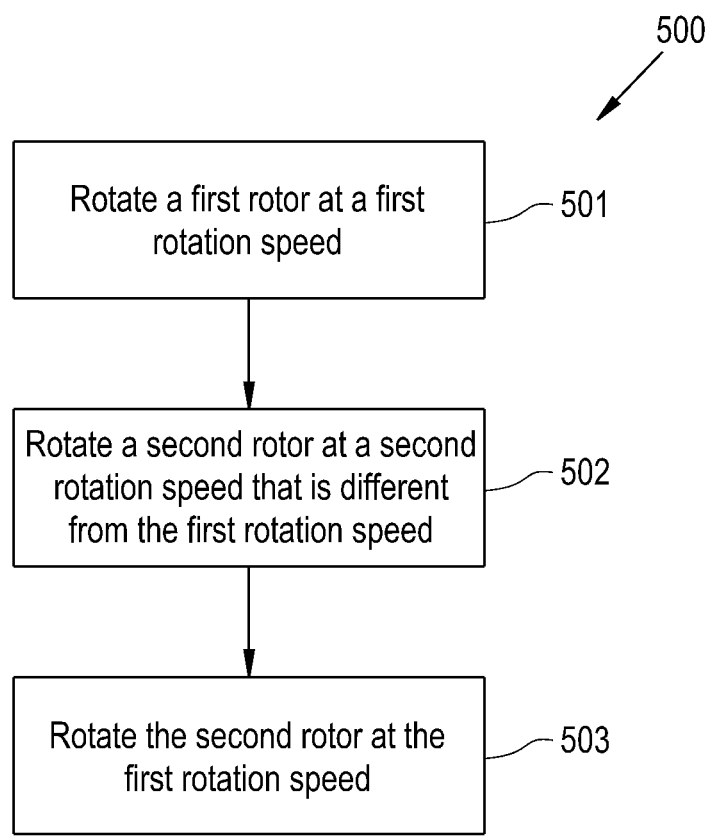
FIG. 5 is a flow chart illustrating an exemplary embodiment of a method of controlling chop quality of crop material fed to a bale chamber, provided in accordance with the present disclosure.

Referring now to FIG. 5, an exemplary embodiment of a method 500 for controlling chop quality of crop material fed to a bale chamber 9 of an agricultural baler 1 provided according to the present disclosure is illustrated. The method 500 includes rotating 501 the first rotor 230, which includes the first extensions 231, about a first axis of rotation AR1 at a first rotation speed and rotating 502 the second rotor 240, which includes the second extensions 241, about a second axis of rotation AR2 at a second rotation speed that is different than the first rotation speed. In some embodiments, the second rotation speed is a different magnitude than the first rotation speed and/or is in a rotation direction RD2 that is opposite to a rotation direction RD1 of the first rotor 230. The difference in the rotation speeds of the rotors 230, 240 can control the aggressiveness of the chop quality, as previously described. When little, or no, chopping of crop material is desired, the second rotor 240 can be rotated 503 at the first rotation speed.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An agricultural baler, comprising:
   a chassis;
   a power take-off carried by the chassis;
   a bale chamber carried by the chassis and comprising a baling mechanism coupled to the power take-off and configured to form a bale from fed crop material; and
   a feeder unit carried by the chassis and configured to feed crop material toward the bale chamber, the feeder unit comprising:
   a first rotor comprising a plurality of first extensions extending therefrom, the first rotor being configured to rotate about a first axis of rotation at a first rotation speed; and
   a second rotor arranged in parallel with the first rotor relative to the first axis of rotation and comprising a plurality of second extensions extending therefrom that intermesh with the plurality of first extensions, the second rotor being configured to rotate about a second axis of rotation at a second rotation speed that is different from the first rotation speed.

2. The agricultural baler of claim 1, wherein each of the plurality of first extensions comprises a leading edge, relative to a feeding direction, and each of the plurality of second extensions comprises a sharp trailing edge relative to the feeding direction.

3. The agricultural baler of claim 1, further comprising a first rotor driver coupled to the first rotor and a second rotor driver coupled to the second rotor.

4. The agricultural baler of claim 3, further comprising a controller coupled to the second rotor driver, the controller being configured to output a second rotation speed signal to the second rotor driver to rotate the second rotor at the second rotation speed.

5. The agricultural baler of claim 1, wherein the second rotation speed is at least one of a different magnitude from the first rotation speed or in a direction opposite to a rotation direction of the first rotor.

6. The agricultural baler of claim 1, further comprising a gearbox comprising a gearbox input rotatably coupled to the first rotor and a gearbox output rotatably coupled to the second rotor.

7. The agricultural baler of claim 1, wherein the second rotor is also configured to rotate at the first rotation speed.

8. The agricultural baler of claim 2, wherein the trailing edge of each of the second extensions has a reduced thickness compared to the rest of the respective second extension.

9. The agricultural baler of claim 1, further comprising a pick-up device configured to feed crop material toward the feeder unit.

10. The agricultural baler of claim 3, wherein the second rotor driver is configured to rotate the second rotor at the second rotation speed that is in a direction opposite to a rotation direction of the first rotor.

11. The agricultural baler of claim 1, wherein the baling mechanism comprises a plunger and a crank mechanism coupled to the plunger.

12. The agricultural baler of claim 6, wherein the gearbox has an adjustable gear ratio that controls a ratio of the first rotational speed to the second rotational speed.

13. The agricultural baler of claim 12, further comprising a controller that is configured to control the adjustable gear ratio of the gearbox.

14. The agricultural baler of claim 4, wherein the controller is configured to output the second rotation speed signal to the second rotor driver so the second rotor driver rotates the second rotor at the second rotation speed that is less than the first rotation speed.

15. A method of controlling chop quality of crop material fed to a bale chamber carried by a chassis of an agricultural baler, the method comprising:
rotating a first rotor comprising a plurality of first extensions about a first axis of rotation at a first rotation speed; and
rotating a second rotor at a second rotation speed that is different from the first rotation speed, the second rotor being arranged in parallel with the first rotor relative to the first axis of rotation and comprising a plurality of second extensions extending therefrom that intermesh with the plurality of first extensions, the first rotor and the second rotor being carried by the chassis of the agricultural baler and configured to feed crop material toward the bale chamber of the agricultural baler during rotation, the bale chamber comprising a baling mechanism that is configured to form a bale from fed crop material.

16. The method of claim 15, wherein each of the plurality of first extensions comprise a leading edge, relative to a feeding direction, and each of the plurality of second extensions comprises a sharp trailing edge relative to the feeding direction.

17. The method of claim 15, wherein a first rotor driver is coupled to the first rotor and a second rotor driver is coupled to the second rotor.

18. The method of claim 15, wherein the second rotation speed is at least one of a different magnitude from the first rotation speed or in a direction opposite to a rotation direction of the first rotor.

19. The method of claim 15, further comprising rotating the second rotor at the first rotation speed.

20. The method of claim 15, wherein the first rotation speed is greater than the second rotation speed.

* * * * *